(12) United States Patent
Jolley

(10) Patent No.: US 7,201,112 B2
(45) Date of Patent: Apr. 10, 2007

(54) FILLED SHELL DEVICES AND METHODS OF MANUFACTURING

(76) Inventor: Mark W. Jolley, 3593 Bluff Ct., Carlsbad, CA (US) 92008

( * ) Notice: Subject to any disclaimer, the term of this patent is extended or adjusted under 35 U.S.C. 154(b) by 0 days.

(21) Appl. No.: 10/781,320

(22) Filed: Feb. 18, 2004

(65) Prior Publication Data

US 2004/0259439 A1 Dec. 23, 2004

Related U.S. Application Data

(60) Provisional application No. 60/448,218, filed on Feb. 18, 2003.

(51) Int. Cl.
*B63B 5/24* (2006.01)
*B63B 25/79* (2006.01)

(52) U.S. Cl. .................. 114/357; 114/39.14; 441/65; 441/74

(58) Field of Classification Search ............... 114/357, 114/39.14; 441/65, 74; 264/544, 545, 548, 264/553
See application file for complete search history.

(56) References Cited

U.S. PATENT DOCUMENTS

| | | | | |
|---|---|---|---|---|
| 4,116,736 A | * | 9/1978 | Sanson et al. | 156/79 |
| 4,423,000 A | * | 12/1983 | Teraoka | 264/524 |
| 4,551,290 A | * | 11/1985 | Mizell | 264/46.6 |
| 4,798,549 A | * | 1/1989 | Hirsch | 441/74 |
| 5,283,028 A | * | 2/1994 | Breezer et al. | 264/511 |

* cited by examiner

*Primary Examiner*—Sherman Basinger
(74) *Attorney, Agent, or Firm*—Fitch, Even, Tabin & Flannery

(57) ABSTRACT

A method of manufacturing an apparatus, such as a board, is provided where a shell is formed in a forming mold cavity and the shell is substantially filled with a core in a filling mold cavity that substantially prevents distortion of the shell during filling.

17 Claims, 4 Drawing Sheets

Prior Art

FILLED SHELL DEVICES AND METHODS OF MANUFACTURING

Priority of application No. 60/448,218, filed on Feb. 18, 2003 in the United States, is claimed under 35 U.S.C. § 119.

FIELD

The apparatus and methods described herein relate to generally to devices having a shell filled with a core produced using plastic thermal forming techniques, and in particular to a board, such as a surfboard.

BACKGROUND

Surfboards and other types of boards are made from a variety of materials using different methods. Initially, surfboards were made by hand carving wood boards. Another way of manufacturing a surfboard involves the use of foam reinforced with fiberglass. Both wood and foam and fiberglass surfboards have durability problems. Another type of surfboard was developed using an epoxy and PVC and EPS core foam sandwiched between fiberglass matting. Although more durable and lighter than wood or foam reinforced fiberglass boards, such boards still have durability problems along with intensive and costly labor necessary to manufacture the boards.

Manufacturing a foam surfboard having fiberglass matting involves multiple steps, such as those illustrated in FIG. 12. The first step is to purchase a foam blank. The blank is a large piece of foam that has yet to be cut to the precise dimensions of the surfboard. There are a variety of different types of blanks for use and manufacturing different types of surfboards. For example, there are blanks for short and long surfboards.

The next step is to cut the blank down to the desired shape. This task involves selecting a template and attaching the template to the blank. The template is a standardized design according to the particular desirability of the surfboard parameters, such as the weight, shape, and width which contribute to the overall balance and feel of the surfboard. The blank is routed or cut with a saw and shaped by hand to correspond to the perimeter of the template. The blank must also be planed to the appropriate thickness. The rails of the surfboard must also be foiled. The surfboard blank is then hand sanded and shaped into the finished design shape.

Once the surfboard blank has been converted into the appropriate form, multiple finishing steps must be performed. One of the first finishing steps is to remove a portion of the blank corresponding to a fin box. A fin box includes attachment means for attaching fins relative to the fin box which in turn is attached to the surfboard. A leash plug is also inserted into the foam board. The leash plug allows for the attachment of a surfboard leash, which is used to tether the surfboard to a rider. Graphics and other artwork may be applied to the foam board.

Fiberglass matting or fiberglass weave is then applied around the entire surfboard. Resin is applied over the fiberglass matting and cured using hot coating techniques. After curing, the resin coated board is sanded to remove any ridges or bumps.

After the surfboard has been coated with fiberglass, striping and other exterior artwork may be applied. The surfboard is typically prepared for a gloss coat of resin. The gloss coat must be allowed to cure prior to hand polishing. Lastly, the surfboard must be cleaned to remove any dust resulting from polishing of the gloss coat.

Many of the typical steps described above requires skilled technicians adding to the increased cost of labor, resulting in a costly surfboard. A typical surfboard made using the above process will take up to ninety-six hours, including drying and curing time. Moreover, many of the functions involve subjective shaping decisions and techniques, which can result in non-uniform surfboards, even when made using identical templates.

SUMMARY

A method of manufacturing an apparatus or device, such as a floatable board, is provided where a shell is formed in a mold cavity and the shell is filled with a core in a mold cavity that substantially prevents distortion of the shell during filling.

The method of manufacturing the device includes providing upper and lower sheets of material. The upper and lower sheets of material may be inserted into an interior of a mold cavity. The upper and lower sheets of material may be formed to the interior of the mold cavity to form a shell. After forming the shell, the shell is filled with an expandable material. During filling of the shell with the expandable material, the shell is prevented from substantially deforming by a mold cavity.

The method of manufacturing a device may include positioning the upper sheet of material above the lower sheet of material within the mold cavity. A perimeter of the upper sheet of material and a perimeter of the lower sheet of material may be clamped relative to each other in the mold cavity, either prior to insertion within the mold cavity or once within the mold cavity. A sealing gasket may be provided between the perimeter of the upper sheet and the perimeter of the lower sheet and clamped therebetween.

Within the mold cavity, at least a portion of the upper and lower sheets of material may be spaced apart. To space the upper and lower sheets of material apart, fluid may be blown between the upper and lower sheets of material. If a gasket is provided between the perimeters of the upper and lower sheets, a fluid inlet tube may be passed through the gasket to allow fluid to space at least a portion of the upper and lower sheets of material apart.

The method of manufacturing a device may include heating the upper and lower sheets of material within the mold cavity and forcing the upper and lower sheets of material against interior walls of the mold cavity to form the shell. Forcing the upper and lower sheets of material against interior walls of the mold cavity may include drawing the upper and lower sheets of material against the interior walls and may be accomplished with a vacuum. Alternatively, or in conjunction with the vacuum, pressure between the upper and lower sheets may be used to force the sheets against the interior walls of the mold cavity. For example, one or more needles may be inserted through one or both of the upper and lower sheets, such as on the sheet where fins will eventually be attached, and compressed air injected between the sheets to force the sheets against the interior cavity walls. During the forming of the shell, the perimeters of the upper and lower sheets may become bonded to each other. Once the shell has been formed within the mold cavity, excess portions of the first and second sheets of material, along with any gasket, may be removed.

The method of manufacturing a device may include forming an aperture in the shell to allow for filling of the shell with the expandable material. To assist in filling of the shell, a filling device may be passed though the aperture and into the shell. The expandable material may then flow through the filling device and into the shell. During filling of the shell with the expandable material, the filling device may be withdrawn from within the shell in a controlled manner.

To prevent the shell from substantially deforming during filling with the expandable material, the shell may be placed within a mold cavity having internal dimensions substantially similar to external dimensions of the shell. The mold cavity for substantially preventing deforming during filling may be a different mold cavity than the mold cavity used for forming the shell. However, the filling mold cavity may be the same mold cavity as the forming mold cavity. To provide added structural rigidity to the device, the filling mold cavity may be heated while the expandable material is filling the shell to allow the expandable material to at least partially bond to the shell.

The method of manufacturing a device may include applying graphics to at least one of first and second sheets of material prior to inserting the upper and lower sheets of material into the interior of the forming mold cavity. The graphics may be disposed on the interior of the shell. Once the shell is filled with the expandable material to form the device, any graphics are on the interior of the shell may be protected from marring, such as by scratching.

The expandable material may comprise polyurethane, and in particular may comprise a rigid polyurethane. The expandable material may also comprise an expanded polystyrene, or other suitable materials. The upper and lower sheets of material forming the shell may comprise polycarbonate, and in particular a weatherable polycarbonate. The sheets may also comprise other suitable materials, such as acrylonitrile butadiene styrene (ABS) and thermal-plastic poly-olethin (TPO). The sheets may be multi-layered, such as having protective film on their outer surfaces, or a metallic or colored graphic film on their inner surfaces.

A method of manufacturing a device, such as a floatable board, is provided, where means are provided for forming at least two sheets of material to the interior of a mold cavity to form a shell. Means may also be provided for filling the shell with an expandable material. Means may further be provided for preventing the shell from substantially deforming during filling with the expandable material.

A device, such as a board or surfboard, made in accordance with the methods of manufacturing a device may comprise a polymer shell having first and second sheets of material. The first and second sheets of material may each have a perimeter, and the perimeters of the first and second sheets of material may be bonded together. A core of a material different than the material of the first and second sheets may substantially fill the interior of the shell. The core may have residual compressive stresses to provide structural rigidity to the shell.

The apparatus and methods for producing the apparatus described herein are not limited to boards or surfboards, and are applicable to other types of devices. For example, the methods described herein can be used to produce floatable boards, such as knee boards, kite surfing boards, body boards, wake boards, skim boards, and wind surfing boards. The methods can also be used to produce other devices, such as ocean kayaks and paddle boats. The methods can also be used to produce non-aquatic devices, such as highway barrier panels and saddle trees for saddles.

DETAILED DESCRIPTION

There is provided a new method for manufacturing an apparatus or device using plastic thermal forming processes, and a device made according to the new method. The apparatus and methods are described herein in the context of a surfboard by way of example, but such methods are not limited to use in producing surfboards or any particular type of board.

By using a specialized plastic thermal-forming process to create a hollow shell and then a controlled filling process to fill the shell, the number and inherent costs of steps often required to produce a typical surfboard are greatly reduced. Moreover, variations between surfboards are minimized to produce consistently manufactured surfboards having improved durability characteristics while retaining much of the balance and feel of surfboards made using traditional methods.

Figure 1:
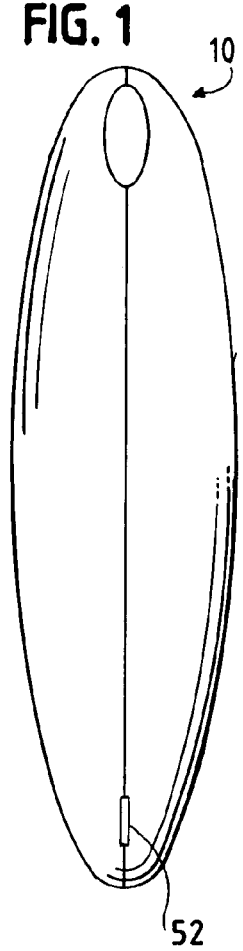
FIG. 1 is a plan view of the bottom of a surfboard made in accordance with methods described herein.
Figure 2:
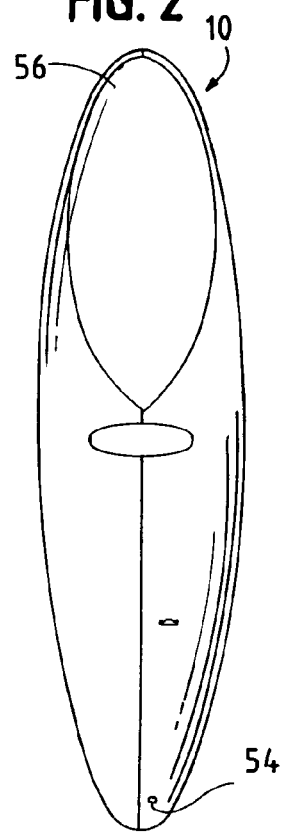
FIG. 2 is a plan view of the top of the surfboard of FIG. 1.
Figure 3:
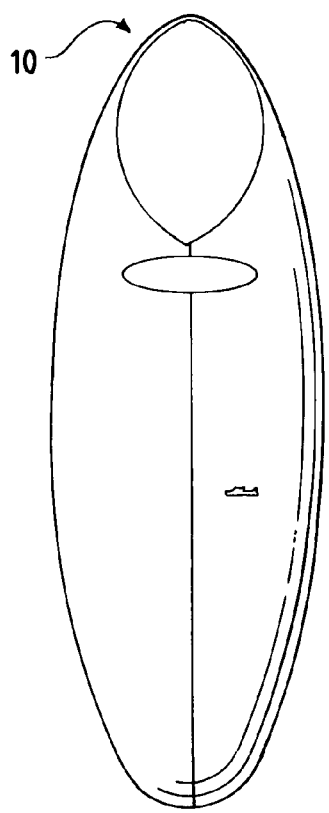
FIG. 3 is a plan view of another top view of the surfboard of FIG. 1.
Figure 11:
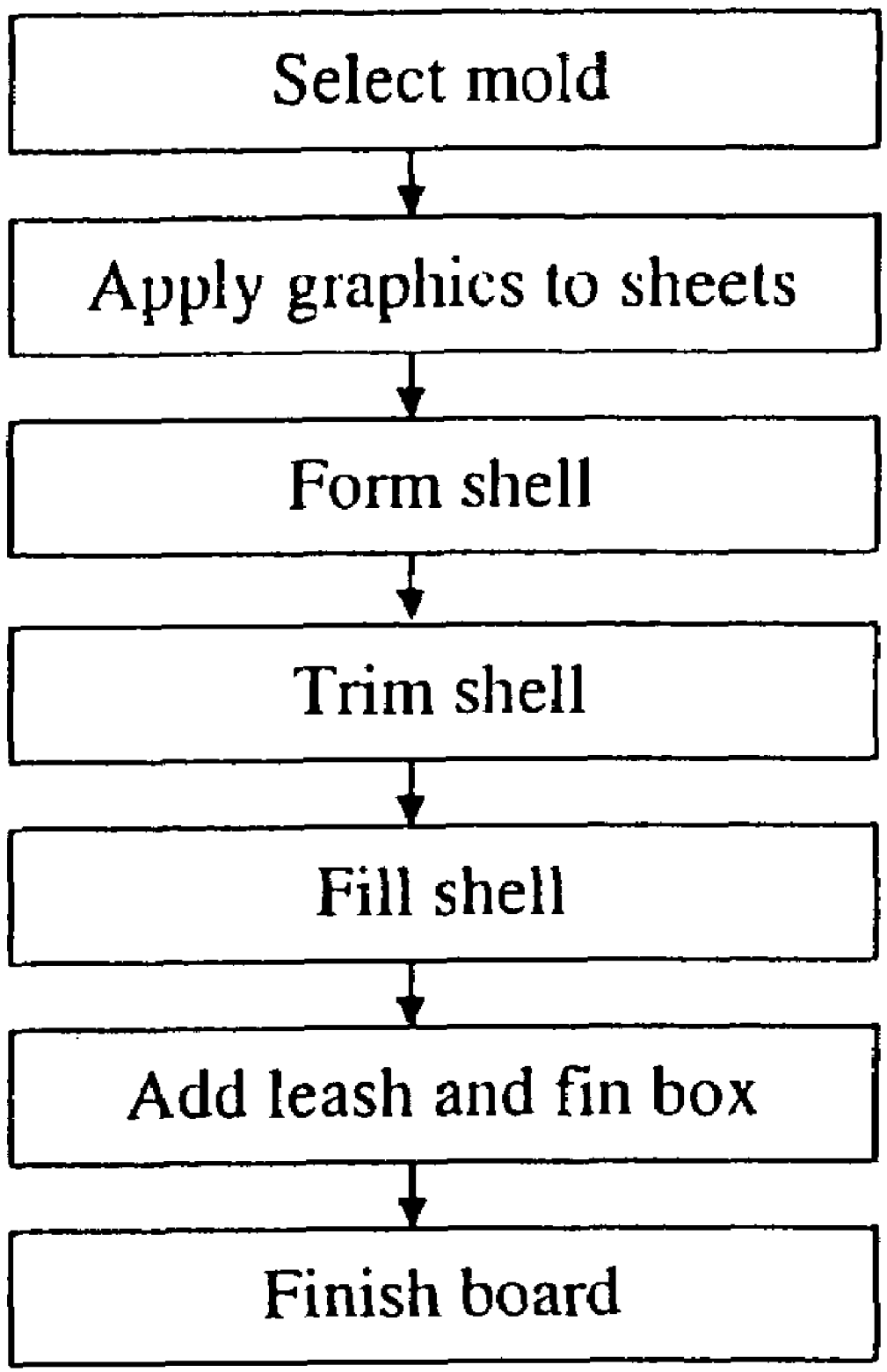
FIG. 11 is a diagrammatic illustration of steps of forming the surfboard of FIG. 1.
Figure 12:
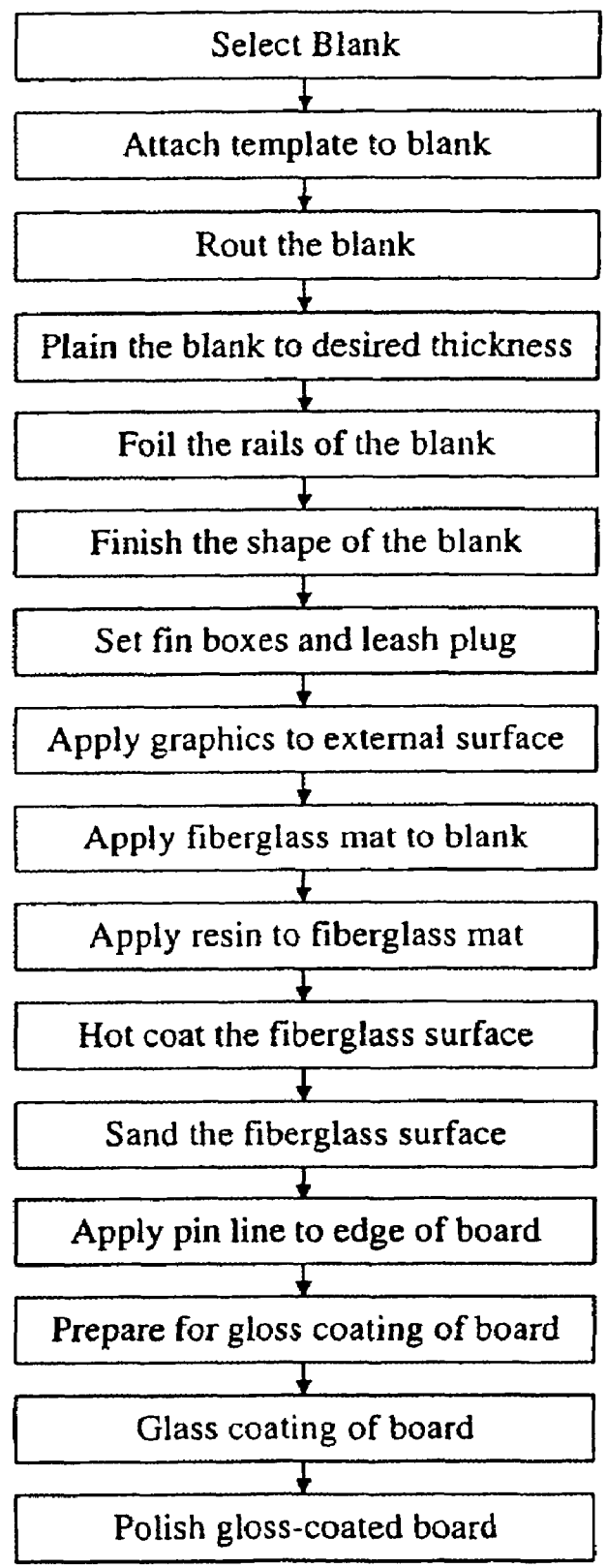
FIG. 12 is a diagrammatic illustration of the steps of forming a prior art surfboard.

The method, such as illustrated in FIG. 11, of thermal forming a surfboard 10, such as illustrated in FIGS. 1–3, generally involves the steps of forming a plastic shell 12 for the surfboard 10. The plastic shell 12 is filled with a foam core 14 to add buoyancy and to increase the strength of the surfboard 10.

The plastic shell 12 is made using a two-part thermal mold 20. The mold cavity 22 has a shape selected to produce a plastic shell 12 having an outer perimeter generally corresponding to that of the finished surfboard 10. One or more sheets 16 and 18 of plastic are inserted into the mold cavity 22. Preferably two separate sheets 16 and 18 of plastic are used, although a single sheet of plastic may also be used, such as if folded. The sheets 16 and 18 are preferably formed of a polymer, and more preferably comprise a weatherable polycarbonate. Portions of the sheets 16 and 18 are maintained spaced apart as they are inserted into the mold cavity 22 in order to prevent the portions from bonding, and are preferably maintained at least 0.25 inches apart.

Figure 4:
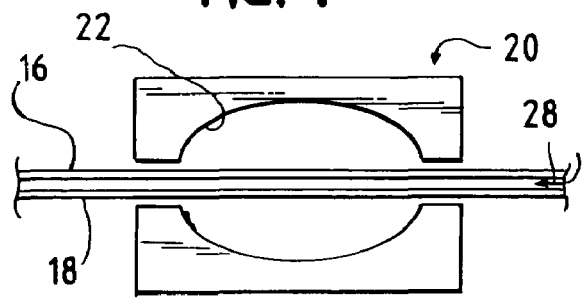
FIG. 4 is a schematic illustration of a pair of plastic sheets within an open forming mold cavity prior to forming.
Figure 8:
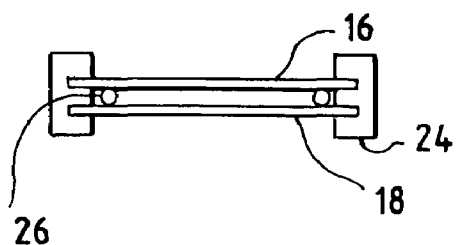
FIG. 8 is a schematic illustration of the pair of plastic sheets of FIG. 3 having perimeters clamped with a gasket therebetween.

The perimeter edges of the two sheets 16 and 18 are held together, such as with a clamp 24. The clamp 24 may be separate from the mold 20, or the clamp may be part of the mold 20. A gasket 26 is provided between the perimeter edges of the sheets 16 and 18 to ensure a generally tight seal between the perimeter edges of the sheets 16 and 18, as illustrated in FIG. 8. A needle is inserted through the gasket material in order to blow fluid between the sheets 16 and 18 to maintain the two sheets 16 and 18 spaced apart, except where the sheets 16 and 18 are clamped together around the gasket, as illustrated in FIG. 4. The fluid is preferably air, although other fluids may also be suitable. The fluid is preferably heated to assist in forming the plastic sheets 16 and 18 to the interior of the mold cavity 22.

Figure 5:
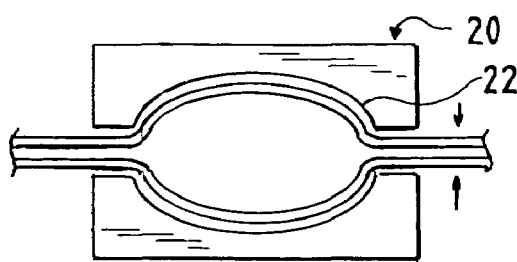
FIG. 5 is a schematic illustration of the pair of plastic sheets of FIG. 4 having fluid blown therebetween disposed within the closed forming mold cavity.
Figure 6:
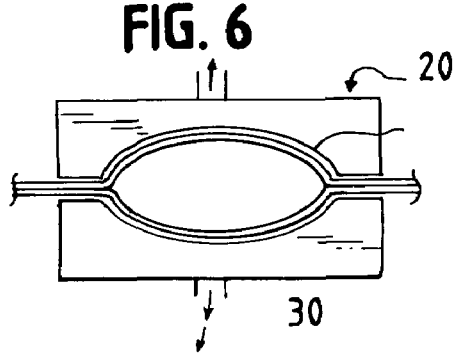
FIG. 6 is a schematic illustration of the pair of plastic sheets of FIG. 3 having fluid blown therebetween disposed within the closed forming mold cavity and a vacuum applied.

The two sheets 16 and 18, clamped together and separated inside by the fluid, are inserted into the mold cavity 22. Once within the mold cavity 22 and the mold cavity 22 is closed, the plastic sheets 16 and 18 are heated. The heating may be accomplished by the heated fluid, heating of the mold 20, placing of the mold cavity 22 within an oven, or a combination of these methods. The mold 20 is preferably formed using aluminum in order to improve the heat transfer properties to the plastic sheeting. However, a fiberglass mold or other suitable mold materials may be also used. The mold 20 is heated to approximately 350° F. and the fluid pressure between the sheets 16 and 18 in the cavity 22 is increased in order to conform each of the upper and lower plastic sheets 16 and 18 to each of the mold portions, as illustrated in FIG. 5. A vacuum may also be used to draw the sheets 16 and 18 against the interior surfaces of the mold cavity 22, such as by providing vacuum holes integral with the mold 20, as illustrated in FIG. 6. The mold 20 may be liquid cooled in order to facilitate control of the temperature of the mold 20 and thus the temperature of the plastic sheets 16 and 18. During the forming process within the mold cavity 22, portions of the perimeters of the sheets 16 and 18 are bonded to each other to form the hollow shell 12.

Figure 7:
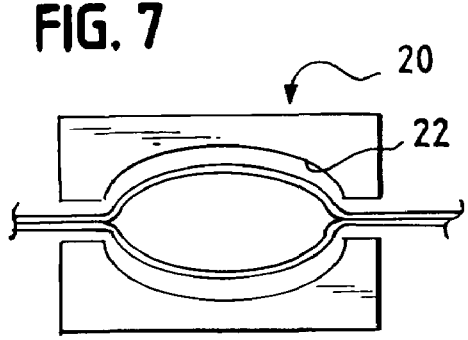
FIG. 7 is a schematic illustration of the pair of plastic sheets of FIG. 3 within the open forming mold cavity after forming.
Figure 9:
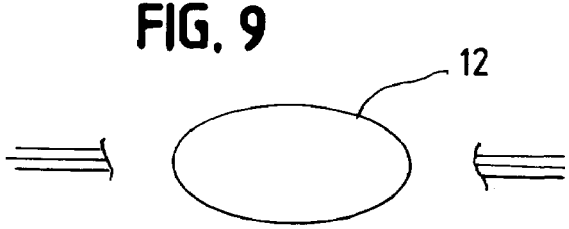
FIG. 9 is a schematic illustration of the shell after trimming.
Figure 10:
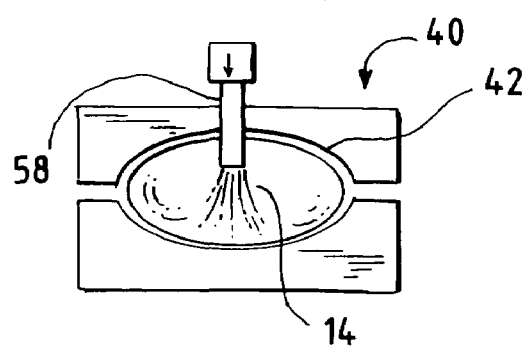
FIG. 10 is a schematic illustration of the shell in a filling mold cavity being filled with a core material.

When the mold 20 halves are brought together, the clamped portion with the gasket 26 therebetween is preferably disposed external of the mold cavity 22. In this manner, the plastic shell 12 is formed within the mold cavity 22, while the previously clamped together edges of the two plastic sheets 16 and 18, including the gasket 26, are external to the mold cavity 22. When the plastic shell 12 is removed from the mold cavity 22, a hot knife or trimmer is used to pull out the gasket 26 and remove flash surrounding the perimeter of the shell 12, as illustrated in FIGS. 7 and 9.

After any flash has been trimmed and the gasket has been removed, the plastic shell 12 is transferred to a filling mold 40. The filling mold 40 has substantially the same cavity 42 configuration as the cavity 22 of the forming mold 20. Once inserted into the filling mold cavity 42, the shell 12 is ready for insertion of the expandable material forming the core 14. The expandable material preferably is polyurethane, and more preferably is a foam polyurethane that hardens and becomes rigid, having a density of between 1.5 lbs. and 5 lbs, and more preferably about 1.8 lbs. A preferred type of polyurethane foam is manufactured by ETECO, of Santa Ana, Calif.

An aperture 54 is formed at one end of the shell 12 to allow for insertion of the foam into the shell 12. Preferably, the aperture 54 is positioned and sized to allow for use for later insertion of a leash plug and thus attachment of a leash, as illustrated in FIG. 2. Accordingly, no unnecessary openings are made into the shell 12. The polyurethane foam is inserted into the shell 12 using a filling device, such as a tube 58, that is inserted through the leash plug opening 54. The tube 58 is extended through the aperture 54 and toward the end of the shell 12 opposite the aperture 54. The foam is pumped in a liquid state into the surfboard 10 while the filling device 58 is slowly being withdrawn. This insures that the foam fills the entire cavity within the surfboard shell 12. Preferably, the tube 58 is withdrawn automatically, although manual withdrawal of the tube 58 may also be acceptable. According to one aspect of the method of manufacturing a surfboard 10, the filling of the shell 12 with the polyurethane is accomplished by use of a Decker machine.

The polyurethane core 14 gives both buoyancy to the surfboard 10 and improves the structural strength of the surfboard 10. The structural strength of the surfboard 10 is improved because the polyurethane is inserted into the surfboard 10 in a liquid state but quickly expands in order to form a rigid inner core 14 for the surfboard 10. The use of the filling mold 40 is used in order to prevent the foam from distorting the plastic shell 12 as it expands. Indeed, the liquid may expand to 4–10 times its size in the liquid state as it hardens. Once solidified, residual compressive stresses in the core 14 further contribute to the strength of the surfboard 10. The shell 12 may be heated during filling to approximately 200° F. The heating of the shell 12 facilitates bonding with the polyurethane and the shell 12 to further add to the structural strength of the surfboard 10.

Several fin box cavities 52 may be configured by shaping within the forming mold cavity 22, as illustrated in FIG. 1. After the shell 12 has been filled, a fin box may be attached to one of the fin box cavities, such as using an epoxy. However, the fin box itself may alternatively be formed using the forming mold cavity. Also after the shell 12 has been filled, the leash plug may be inserted into the filling aperture and a leash attached thereto.

The upper and lower plastic sheets 16 and 18 may be transparent. When they are transparent, the polyurethane inserted into the surfboard 10 may be provided with a coloring dye in order to provide color to the appearance of the finished surfboard 10. For example, a white polyurethane may be used to provide a white appearance to the surfboard 10 when the plastic sheeting is clear. In this manner, painting, coloring and coating of the surfboard 10 is not necessary, as typical with the traditional surfboard 10 manufacturing methods.

Turning to more of the details of the shell 12 material, the plastic sheeting used in forming the shell 12 is preferably either a weatherable polycarbonate or a PETG plastic, although other polymer materials may also be suitable. The plastic preferably has a distortion point at about 280° F. Each of the plastic sheets 16 and 18 is between 0.004 and 0.012 inches in thickness. The thickness of the plastic sheets 16 and 18 is selected to provide both sufficient structural benefits, such as durability and strength, and forming benefits, such as for allowing controlled thermal forming of the material. The upper and lower plastic sheets 16 and 18 may have graphics 56 applied on their interiors prior to insertion into the shell-forming mold cavity 22. The graphics 56 may be either printed on the inner surfaces of the upper and lower plastic sheets 16 and 18 or may be applied using decals, stickers or other manners of adhesion. The graphics 56 are preferably applied in a manner so that the forming process will not unintentionally distort the graphics 56. Having the graphics 56 on the insides of the clear plastic sheets 16 and 18 insures that during use of the surfboard 10 the graphics 56 will not be scratched, marred or otherwise deformed.

The method of manufacturing a surfboard 10 results in a surfboard 10 having an outer shell 12 substantially filled with a core, as illustrated in FIG. 1. The outer shell 12 is formed from first and second sheets 16 and 18 of material, such as the polycarbonate discussed above. Each of the first and second sheets 16 and 18 of material has a perimeter, and the perimeters of the first and second sheets 16 and 18 of material are bonded together. The core 14 is formed of a material different than the material of the first and second sheets 16 and 18, such as the polyurethane discussed above. The core substantially fills the interior of the shell 12 and is becomes rigid once solidified to provide structural rigidity to the shell 12, and may include residual compressive stresses to further improve the strength of the surfboard 10.

The finished surfboard 10 has approximately the same balance and feel as surfboards made using traditional methods. For example, the finished surfboard 10 made according to the method described herein weighs approximately 5–12 lbs. for a short board, or 12–25 lbs. for a long board.

The method of manufacturing a surfboard 10 may begin in a store. At the store, a customer may select a particular type of surfboard 10 from among several different types of surfboards. The surfboards may differ by design or designer, size, or other similar parameters. The selecting of a particular type of surfboard 10 may be accomplished using an electronic graphical interface, such as a computer. The computer may communicate the selection to a manufacturing facility, where a mold 20 corresponding to the particular type of surfboard 10 selected is used to produce the desired surfboard 10. Graphics 56 and colors may also be selected by the customer using the graphical interface, allowing for many different custom variations of the selected surfboard design. Delivery of the surfboard 10 may be made to the store, or directly to the customer. Moreover, the store may be entirely online, allowing for direct customer access with a computer.

As can be appreciated from the above description of FIGS. 1–12, there is provided a new improved method for manufacturing a board by forming a shell and then filling the shell with a core and a surfboard made according to the method. While the above description references use of the methods for producing a surfboard, the methods described herein are applicable to other devices and are not limited to surfboards, or even to floatable boards. While there have been illustrated and described particular embodiments, it will be appreciated that numerous changes and modifications will occur to those skilled in the art, and it is intended in the appended claims to cover all those changes and modifications which fall within the true spirit and scope thereof.

The invention claimed is:

1. A method of manufacturing a board, the method comprising:
   providing upper and lower sheets of material;
   inserting the upper and lower sheets of material into an interior of a first mold cavity;
   clamping perimeters of the upper and lower sheets of material;
   forming the upper and lower sheets of material to the interior of the first mold cavity following clamping of the perimeters of the upper and lower sheets of material to form a shell having a single hollow interior;
   filling the entire shell with an expandable material; and
   preventing the shell from substantially deforming during filling with the expandable material by inserting the shell into a second mold cavity having a shape substantially conforming to the shell, the second mold cavity being different from the first mold cavity.

2. The method of manufacturing a board in accordance with claim 1, wherein the step of inserting the upper and lower into an interior of a first mold cavity includes:
   positioning the upper sheet of material above the lower sheet of material; and
   clamping a perimeter of the upper sheet of material and a perimeter of the lower sheet of material.

3. The method of manufacturing a board in accordance with claim 2, including the step of providing a gasket between the perimeter of the upper sheet and the perimeter of the lower sheet.

4. The method of manufacturing a board in accordance with claim 2, including the step of spacing at least a portion of the upper and lower sheets of material apart.

5. The method of manufacturing a board in accordance with claim 4, including the step of blowing fluid between the upper and lower sheets of material for spacing at least a portion of the upper and lower sheets of material apart.

6. The method of manufacturing a board in accordance with claim 5, wherein the step of blowing fluid between the upper and lower sheets of material for spacing at least a portion of the upper and lower sheets of material apart includes passing a fluid inlet tube through a gasket.

7. The method of manufacturing a board in accordance with claim 1, wherein the step of forming the upper and lower sheets of material to the interior of the mold cavity to form a shell includes:
   heating the upper and lower sheets of material; and
   forcing the upper and lower sheets of material against interior walls of the mold cavity.

8. The method of manufacturing a board in accordance with claim 7, wherein the step of forcing the upper and lower sheets of material against interior walls of the mold cavity includes at least one of drawing the upper and lower sheets of material against the interior walls with a vacuum and forcing the upper and lower sheets of material against the interior walls with a pressure force between the sheets.

9. The method of manufacturing a board in accordance with claim 1, including the step of trimming excess portions of the first and second sheets of material after forming the shell.

10. The method of manufacturing a board in accordance with claim 1, wherein the step of filling the shell with the expandable material comprises the steps of:
    forming an aperture in the shell;
    inserting a filling device though the aperture; and
    passing the expandable material through the filling device and into the shell.

11. The method of manufacturing a board in accordance with claim 10, wherein the expandable material is at least one of polyurethane and polystyrene.

12. The method of manufacturing a board in accordance with claim 11, including the step of withdrawing the filling device from within the shell while the shell is being filled with the expandable material.

13. The method of manufacturing a board in accordance with claim 10, including the step of heating the mold cavity to allow the expandable material to at least partially bond to the shell.

14. The method of manufacturing a board in accordance with claim 1, including the step of applying graphics to at least one of first and second sheets of material prior to the step of inserting the upper and lower sheets of material into an interior of a mold cavity.

15. The method of manufacturing a board in accordance with claim 1, wherein the first and second sheets of material comprise at least one of polycarbonate, ABS and TPO.

16. A method of manufacturing a board, the method comprising:

provuding upper and lower sheets of material;

inserting the upper and lower sheets of material into an interior of a first mold cavity, including positioning the upper sheet of material above the lower sheet of material, providing a gasket between the perimeter of the upper sheet and the perimeter of the lower sheet, and clamping a perimeter of the upper sheet of material and a perimeter of the lower sheet of material;

forming the upper and lower sheets of material to the interior of the first mold cavity to form a shell having a single hollow interior;

filling the entire shell with an expandable material; and preventing the shell from substantially deforming during filling with the expandable material by inserting the shell into a second mold cavity having a shape substantially conforming to the shell, the second mold cavity being different from the first mold cavity.

17. A method of manufacturing a board, the method comprising:

providing upper and lower sheets of material;

inserting the upper and lower sheets of material into an interior of a first mold cavity, including positioning the upper sheet of material above the lower sheet of material and clamping a perimeter of the upper sheet of material and a perimeter of the lower sheet of material;

spacing at least a portion of the upper and lower sheets of material apart by blowing fluid between the upper and lower sheets of material and passing a fluid inlet tube through a gasket;

forming the upper and lower sheets of material to the interior of the first mold cavity to form a shell having a single hollow interior;

filling the entire shell with an expandable material; and preventing the shell from substantially deforming during filling with the expandable material by inserting the shell into a second mold cavity having a shape substantially conforming to the shell, the second mold cavity being different from the first mold cavity.

* * * * *